United States Patent [19]
Mullins

[11] Patent Number: 4,517,631
[45] Date of Patent: May 14, 1985

[54] INDIRECT LIGHT REFLECTOR

[75] Inventor: Jack R. Mullins, Missouri City, Tex.

[73] Assignee: J. W. Lighting Inc., Houston, Tex.

[21] Appl. No.: 610,019

[22] Filed: May 14, 1984

[51] Int. Cl.$^3$ ............................................... F21V 7/00
[52] U.S. Cl. .................................... 362/346; 362/217;
362/296; 362/297; 362/298; 362/347; 362/349;
362/350
[58] Field of Search ............... 362/217, 296, 297, 298,
362/346, 347, 349, 350

[56] References Cited
U.S. PATENT DOCUMENTS

| | | | |
|---|---|---|---|
| 4,300,185 | 11/1981 | Wakamatsu | 362/33 |
| 4,327,969 | 5/1982 | Giutronich et al. | 362/297 X |
| 4,414,609 | 11/1983 | Shemitz | 362/33 |
| 4,434,453 | 2/1984 | Campbell | 362/33 |

Primary Examiner—Stephen J. Lechert, Jr.
Attorney, Agent, or Firm—Darby & Darby

[57] ABSTRACT

A reflector for use with a light source in which the light source is shielded from direct view. The reflector provides even illumination, with high efficiency by reflecting light from the light source around the light source rather than to be blocked thereby.

17 Claims, 6 Drawing Figures

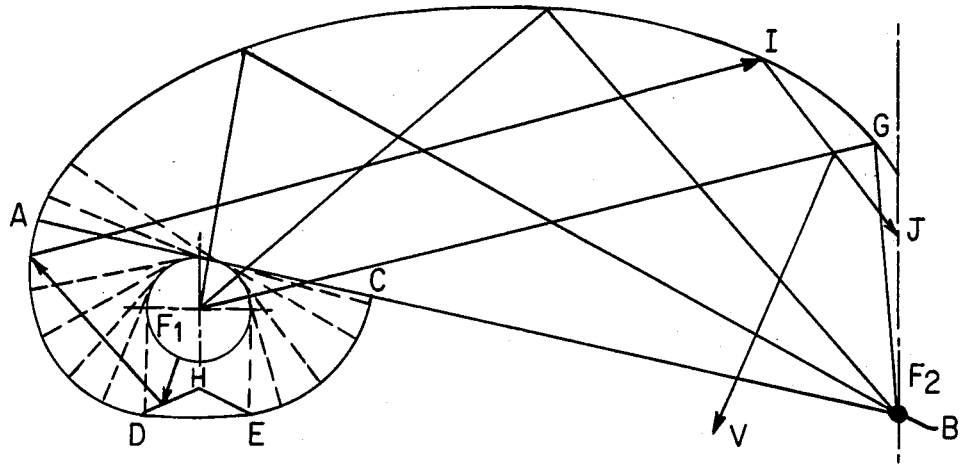
FIG. 4
FIG. 6
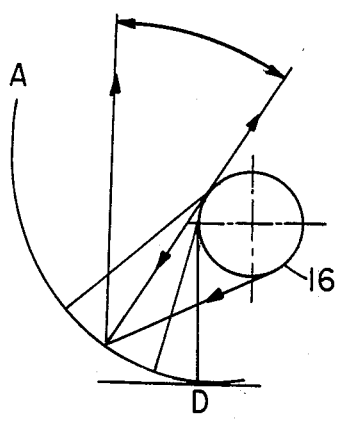
FIG. 5

INDIRECT LIGHT REFLECTOR

BACKGROUND OF THE INVENTION

1. Field of the Invention

This invention pertains to the art of light reflectors and more specifically to a novel and improved light reflector for providing even illumination from a lamp, while hiding the lamp directly from view.

2. Description of the Prior Art

Substantial efforts have been made to provide good general illumination with flourescent lamps, particularly as used in ceiling fixtures which obscure the lamps from direct view. Typical of such fixtures are ceiling light fixtures which are used with hung or suspended celings. Such fixtures include housings recessed within the ceilings and lenses, or diffusers, in the openings of the housings to distribute the light produced by the lamp.

Generally if the lamp is to be hidden from direct view, the light from the lamp must be reflected from a reflector which is visible. In prior art designs, such as U.S. Pat. No. 3,560,729 the majority of the light produced by the fixture is directly incident upon the main reflector. The rest of the light, for example that produced from the portion of the lamp facing away from the reflector, is reflected by a secondary relector to pass through or by the lamp. Prior art designs have not permitted this light to pass around the lamp and instead the light has passed through the lamp if it is used at all. These reflectors are therefore inefficient since the lamp itself will, to a greater or lesser extent, attenuate the light passing through it. This has been a common problem with fixtures which have sought to obscure the lamp from view such as for example as disclosed in U.S. Pat. Nos. 1,835,745 1,815,751 and 1,775,619 in in which the light reflected from the portion of the lamp facing away from the main reflector is reflected back toward the center of the lamp by a spherical secondary reflector. These lamps thus suffer from a poor lighting efficiency since a substantial portion of the light emanating from the lamp is attenuated by the lamp itself.

It is also generally desirable to provide an even illumination, particularly with overhead or ceiling fixtures, to prevent dark or poorly lighted areas in the space illuminated by the lamp.

SUMMARY

The present invention is directed to a highly efficient light reflector providing a pleasing and uniform illumination. The reflector includes a main elliptical reflector and at least one additional secondary reflector having a contour selected to allow substantially all the light generated by the light source and incident thereto to pass around it. Generally the light source is elongated, for example a conventional fluorescent lamp.

In a preferred embodiment of the invention the light source is placed at one focus of a semi-elliptical reflector forming the main reflector. The secondary reflector, which is generated from a plurality of surfaces normal to a tangent drawn from the surface of the light source is located such that the light source is between the main and secondary reflector.

It is therefore an object of the present invention to provide a light relector for producing illumination of a uniform and pleasing nature.

It is a further object to provide a light reflector which obscures the light source from view.

It is another object to provide a light reflector that efficiently reflects the light from an obscured light source in a uniform and pleasing manner such that the light source does not block the light it produces.

These and other objects and advantages of the present invention will become more apparent upon reference to the description and the annexed drawings.

BRIEF DESCRIPTION OF THE DRAWINGS

FIG. 4 is a ray trace diagram of an alternative embodiment of the reflector of the present invention;

FIGS. 5 and 6 are ray trace diagrams of the present invention useful in explanation thereof.

DESCRIPTION OF PREFERRED EMBODIMENTS

Figure 1:
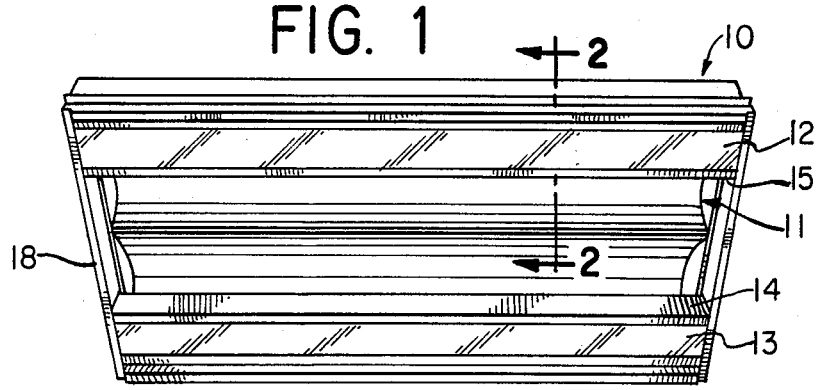
FIG. 1 is a perspective view of a fixture utilizing the reflector of the present invention.
Figure 2:
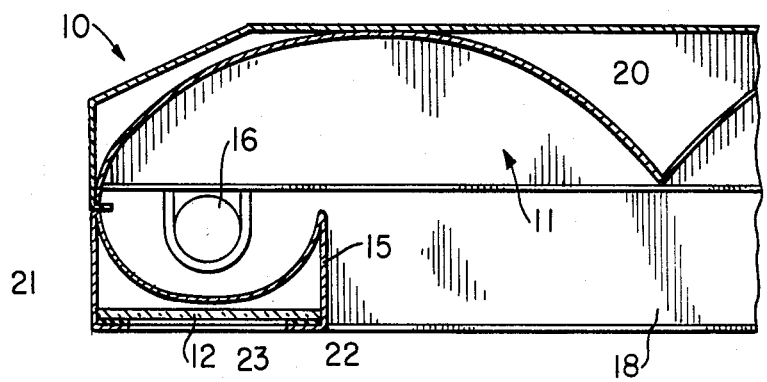
FIG. 2 is a sectional view of the reflector of FIG. 1 taken along line 2—2.

FIG. 1 shows a ceiling type lighting fixture 10 utilizing the reflector 11 according to the present invention. Fixture 10 includes decorative panels 12, 13, 14, and 15. Referring to FIG. 2, light sources 16 are located behind panels 12, 13, 14 and 15 and is hidden from view. Light sources 16 may typically be fluorescent lamps of a conventional type having a single cylindrical envelope with a circular cross-section or outer surface. It will be clear to those skilled in the art that lamps having other shapes may also be used with the invention. End panels 18 are included at the ends of the fixture. Light source 16 may be mounted in tombstone sockets 17. Other mounting methods may be used and are not critical to the present invention.

FIG. 2 is a cross-sectional view of substantially one half of the reflector used in the lamp fixture of FIG. 1. The reflector is comprised of four sections or relectors, namely, main reflector 20, disposed opposite a first surface of light source 16, two secondary reflectors 21 and 22 disposed opposite second and third surfaces of light source 16, and back reflector 23, disposed opposite a fourth surface of light source 16. It will be observed that the four surfaces of light source 16 are contiguous, and light source 16 is disposed substantially between main reflector 20 and secondary reflector 21 and 22, and back reflector 23.

Figure 3:
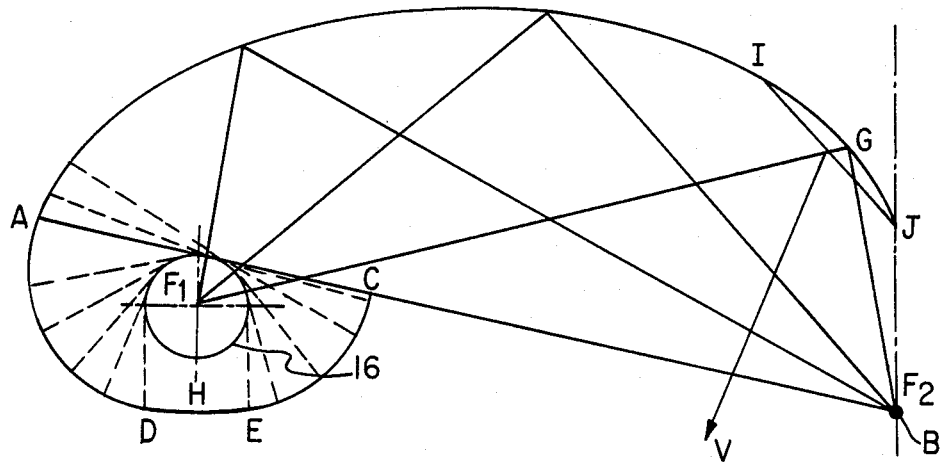
FIG. 3 is a ray trace diagram useful in explaining the present invention.

Referring to FIG. 3 the reflector is divided into four main sections. Section G-A corresponds to main reflector 20 and is the main elliptical section substantially forming a half of an ellipse defined with respect to the ellipses semi-major axis. Sections A-D and E-C are both generated to allow substantially all of the light emitted from the lamp between points defined by the tangents intersecting points A and D and C and E, respectively, to pass around the lamp and corresponds to secondary reflectors 21 and 22. The generation of sections A-D and E-C is described further below. Section D-E corresponds to back reflector 23 and is a connective section located between sections A-D and E-C. Section D-E may be either a linear section as shown in FIG. 3 or a triangular section DHE as shown in FIG. 4 which further improves the light gathering performance of the lamp.

The generation of the shape of sections A-D and E-C is explained by reference to FIGS. 5 and 6. Initially line D-Q is selected as an arbitrary reference line. For convenience D-Q (FIG. 6) is selected to be horizontal, and is ultimately parallel to the normal orientation of the lamp fixture. Any orientation of line D-Q may, however, be selected. Point D is chosen as a starting point to prevent the curve of section A-D, from swinging back upon itself. Point D is located on a tangent Z-D (the starting azimuth) below an edge of the lamp 16 such that tangent Z-D is perpendicular to line D-Q.

A generally small angle O is then selected to provide the smoothest and most accurate reflector contour. After O is chosen an angle of O/2 is used to construct halfway points on the curve to allow for further smoothing.

The first part of the curve is generated by drawing a line $T_1$-$Z_1$ extending toward section A-D tangent to the lamp surface at point $Z_1$ at an angle of O with respect to tangent Z-D. Imaginary line $T_1$ is also drawn tangent to the lamp at an angle O/2, which is extended to intersect line D-Q at point $M_1$. Section D-$M_1$ forms a flat portion of the reflector which is perpendicular to tangent Z-D. It will be understood that although the reflector is shown in cross-section, and described two dimensionally, the lines and curves of the resulting reflector in practice represent surfaces along the length of the elongated light source 16. $M_1$ is located at the halfway azimuth, O/2, with respect to tangent Z-D. A line intersecting point M1 and line $Z_1$-$T_2$ is drawn having point $M_2$ thereon. The resulting line $M_1$-$M_2$ is then formed, representing a flat, reflective surface perpendicular to line $Z_1$-$T_1$ which defines a new azimuth from point $Z_1$. The intersection of line $Z_1$-$T_1$ on $M_1$-$M_2$ is at point $N_1$.

The effect of flat section $M_1$-$M_2$ is such that all light emanating from point $Z_1$ and directed to point $N_1$ will be reflected back upon itself to $Z_1$ and beyond.

Another line tangent to the lamp surface and extending from point $N_1$ is line $N_1$-$Y_1$ which describes an angle O with respect to tangent $T_1$-$Z_1$.

As a result of the laws of reflectivity from specular surfaces, namely, the angle of incidence equals the angle of reflection, light originating from point $Y_1$ on the surface of lamp 16 will reflect off of the surface described by line $M_1$-$M_2$ and be reflected above and beyond lamp 16 as indicated by the line $M_1$-W. Thus, all light emanating between points $Z_1$ and $Y_1$ and incident on point $N_1$ is now reflected past lamp 16.

In like manner, reflector surface $M_2$-$M_3$ is generated. An interval of angle O with respect to azimuth $Z_1$-$T_2$ is selected tangent to surface of lamp 16 at point $Z_2$. Line $Z_2$-$T_2$ is extended at an angle O/2 with respect to azimuth $Z_2$-$N_2$. Line $M_2$-$M_3$ is then drawn normal to line $Z_2$-$T_2$, and extending through point $M_2$. Light from point $Z_2$ directed to point $N_2$ will reflect past point $Z_2$ and beyond lamp 16. Light from point $Y_2$ will reflect along the line $N_2$, past lamp 16. In this manner, all light emanating from the lamp 16 surface between point $Z_2$ and $Y_2$ and incident upon $N_2$ will be reflected past lamp 16.

It will be clear to those skilled in the art that construction of further segments will permit the light from other points on the lamp to be reflected around it. As the sections are made smaller, a substantially continuous curve is generated.

Reflector construction is continued in this manner for additional sections, until Section $M_n$ at point A is reached. A smooth curve is then constructed tangent to each individual reflector section at each point $N_1$, $N_2$, ... $N_n$. This reflective curve maximizes the amount of light passing by the lamp 16 in a minimum amount of space.

Reflector section E-C, which has the same function as that of A-D, namely, to pass light around the lamp, will be constructed in the same manner as section A-D. That is, an initial starting reference line is selected. This may be an extension of line D-Q. The tangents to the right side of the surface of lamp 16 are utilized in the same manner as previously described to generate section E-C.

End point C of section E-C is chosen to fall upon an imaginary line A-B shown in FIGS. 3 and 4, which represents the line of sight of a viewer at postition B. Depending upon the positioning of the lamp fixture, the elevation of line A-B and the location of point C will vary. It will be clear that a viewer's eye located at point B in FIGS. 3 and 4 would not be able to view lamp 16 directly since the lamp 16 line of sight is blocked by section E-C.

Since point B represents the position that a viewer's eye may take, it will be clear that if a lamp is meant to be suspended in, for example, a ceiling installation, point B may be displaced in a downward direction with respect to the lamp sections A-D and D-C and consequently lamp section E-C will become shorter.

Connector section D-E may be a simple flat connective reflector. Light distribution, however, may be enhanced by adding triangular connective section DHE shown in FIG. 4 which will minimize the quantity of light generated from the underside of lamp 16 and reflected back into it. Connector section DHE by virtue of the surfaces DH and HE, angled with respect to one another, will reflect all or most of the light originating from the underside of lamp 16 on to the main elliptical section defined by section A-G or in some instances on to secondary sections A-D and E-C.

The main reflector section A-G is a semi-elliptical section with one focus $F_1$ at the center of the lamp and its second focus, $F_2$, close to line A-B. The semiellipse may be defined as that half of the ellipse above the semimajor axis of the ellipse. The light striking reflector A-G from point $F_1$ will, as is known in the art, be reflected toward focal point $F_2$ and out of the reflector.

$F_2$ is chosen to be close to line A-B but not above it in order to avoid reflecting light to very high locations, where it is not unusually needed.

The light incident on secondary reflector A-D, is reflected past the lamp as previously described and is incident upon the main reflector section A-G thereby increasing reflector efficiency. This light, in general, will be secondarily reflected by the main elliptical section A-G above the focal point $F_2$.

The light incident on secondary reflector surface E-C will be similarly reflected past lamp 16 on to the main elliptical section A-G and will be secondarily reflected by A-G below the focal point $F_2$. Location of $F_2$ is therefore selected to maximize the coverage in a desired area and increase the efficiency of the lamp.

Referring again to FIGS. 3 and 4 reflector section I-J may be added to balance the large amount of light beamed to the higher angles to provide more even illumination. Section I-J is a linear section which, as may be seen from FIGS. 3 and 4 will cause light emanating from the center of lamp 16, in other words, focal point $F_1$, to be returned along line G-V instead of line G-B.

The light thus returned will no longer pass through focal point F₂.

Referring to FIGS. 1 and 2 it can be seen that a reflector, derived according to the above procedures may be utilized with a single lamp. Alternatively, two reflectors that are mirror images of one another may be placed side-by-side as shown in FIGS. 1 and 2 for a accommodating two flourescent lamps. Futhermore, a second lamp may be used and added adjacent to lamp 16, to further increase lumens output of the fixture.

I claim:

1. A reflector for use with a light source comprising:
   first reflector means having first and second focal points, said light source located at said first focal point, a first surface thereof being opposite said first reflector, for reflecting light originating near said first focal point through said second focal point; and
   second reflector means disposed opposite a second surface of said light source for reflecting light received from said second surface around said light source and on to said first reflector means for further reflection therefrom.

2. The lamp according to claim 1 further comprising third reflector means disposed opposite a third surface of said light source for reflecting light received from said third surface around said light source and on to said first reflector means for further reflection therefrom.

3. The lamp according to claim 2 further comprising a fourth reflector means disposed opposite a fourth surface of said light source for reflecting light received therefrom, said fourth reflector being located between said second and third reflector means.

4. The reflector according to claim 3 wherein said first reflector means comprises a surface having a substantially semi-elliptical shape, said first and second focal point being the focal point of said first reflector.

5. The reflector according to claim 4 wherein said lamp has a circular surface, said first surface being opposite said first reflector, said second surface being opposite said second reflector said third surface being opposite said third reflector and said fourth surface being opposite said fourth reflector.

6. The reflector according to claim 5 wherein said lamp is elongate.

7. The reflector according to claim 5 wherein said second reflector means comprises a plurality of small planar surfaces adjacent each other, said surfaces being disposed so that each is normal to a corresponding one of a plurality of tangents to said second portion of said light source surface.

8. The reflector according to claim 5 wherein said second reflector means comprises a curved surface normal to a plurality of tangents to said second surface of said light source.

9. The lamp according to claim 7 wherein said third reflector means comprises a plurality of substantially planar surfaces adjacent each other, said surfaces being disposed so that each is normal to a corresponding one of a plurality of tangents to said third portion of said lamp surface.

10. The reflector according to claim 8 wherein said third reflector means comprises a curved surface normal to a plurality of tangents to said third surface of said light source.

11. The reflector according to claim 9 wherein said adjacent small planar surfaces are substantially continuous and smoothed.

12. The reflector according to claim 9 wherein said fourth reflector means is substantially planar.

13. The reflector according to claim 10 wherein said fourth reflector means is substantially planar.

14. The reflector according to claim 7 wherein said fourth reflector means is at least partially triangular in cross-section for reflecting light received from said fourth surface on to said second and third reflector means for further reflection therefrom.

15. The reflector according to claim 10 wherein said fourth reflector means is at least partially triangular in cross-section for reflecting light received from said fourth surface on to said second and third reflector means for further reflection therefrom.

16. The reflector according to claim 7 further comprising a planar surface coupled to said first reflector means near said second focal point for reflecting light.

17. The reflector according to claim 10 further comprising a planar surface coupled to said first reflector means near said second focal point for reflecing light.

* * * * *